United States Patent
Connorton-Spragg et al.

(10) Patent No.: US 12,454,474 B1
(45) Date of Patent: Oct. 28, 2025

(54) WATER TREATMENT APPARATUS

(71) Applicant: FDI TECHNOLOGIES LTD, Dorchester (GB)

(72) Inventors: Aurora Connorton-Spragg, Dorchester (GB); Paul Spencer, Dorchester (GB); Andrew Woods, Dorset (GB)

(73) Assignee: FDI TECHNOLOGIES LTD, Dorchester (GB)

( * ) Notice: Subject to any disclaimer, the term of this patent is extended or adjusted under 35 U.S.C. 154(b) by 0 days.

(21) Appl. No.: 19/229,124

(22) Filed: Jun. 5, 2025

(30) Foreign Application Priority Data

Jun. 6, 2024 (GB) .................................... 2408039

(51) Int. Cl.
  *C02F 1/46* (2023.01)
  *B01D 61/42* (2006.01)
  *C02F 1/469* (2023.01)
  *C02F 101/10* (2006.01)

(52) U.S. Cl.
  CPC .......... *C02F 1/4691* (2013.01); *B01D 61/428* (2022.08); *C02F 1/4602* (2013.01); *C02F 2101/10* (2013.01); *C02F 2301/024* (2013.01); *C02F 2303/22* (2013.01)

(58) Field of Classification Search
  None
  See application file for complete search history.

(56) References Cited

U.S. PATENT DOCUMENTS

| 3,974,071 A | 8/1976 | Dunn et al. |
| 7,481,922 B2 | 1/2009 | Madden |

FOREIGN PATENT DOCUMENTS

| WO | WO-2018011787 A1 * | 1/2018 | ............ H01M 8/188 |
| WO | WO-2019118163 A1 * | 6/2019 | ................ C02F 1/42 |

OTHER PUBLICATIONS

Algurainy et al. (Desalination, 2024, 586, 117583). (Year: 2024).*
Zhao et al. (Chemical Engineering Journal, 2019, 378, 122136). (Year: 2019).*
Seo et al., Investigation on removal of hardness ions by capacitive deionization (CDI) for water softening applications, Water Research, 2010, pp. 2267-2275, vol. 44 no. 7.
UK Intellectual Property Office, Patents Act 1977: Search Report under Section 17 (Oct. 25, 2024), GB Application GB2408039.2.
UK Intellectual Property Office, Examination Report and Notification of Intention to Grant under Section 18(4) (May 15, 2025), GB Application GB2408039.2.

* cited by examiner

*Primary Examiner* — Clare M Perrin
(74) *Attorney, Agent, or Firm* — Mertzlufft Law PLLC; Joshua D. Mertzlufft

(57) ABSTRACT

There is provided a water treatment apparatus. The apparatus comprises a capacitive deionisation apparatus. The apparatus further comprises a water condition element. The water conditioning element comprises a metal alloy configured such that mineral ions within a flow of water, flowing over a surface of the water conditioning element, precipitate to provide a colloidal dispersion.

13 Claims, 2 Drawing Sheets

WATER TREATMENT APPARATUS

CROSS REFERENCE TO RELATED APPLICATIONS

This application claims priority to G.B. Application No. GB2408039.2, filed on 6 Jun. 2024, the entire disclosure of which is hereby incorporated by reference.

FIELD

The invention relates to a water treatment apparatus for removing mineral ions from water.

BACKGROUND

Water treatment has long been an essential aspect of modern society, ensuring the availability of clean and safe water for various applications including for domestic, industrial and agricultural use.

One of the primary challenges in water treatment is the management and prevention of scale formation, particularly limescale, which is caused by the precipitation of minerals such as calcium carbonate. Hard water is particularly problematic due to the larger concentration of limescale-forming minerals. Limescale build-up can lead to reduced efficiency of components in water systems, increasing maintenance costs and increasing a likelihood of damage to equipment and infrastructure.

The present invention has been devised with the foregoing in mind.

SUMMARY

This Summary is intended to introduce, in an abbreviated form, various topics to be elaborated upon below in the Detailed Description. This Summary is not intended to identify key or essential aspects of the claimed invention. This Summary is similarly not intended for use as an aid in determining the scope of the claims.

According to a first aspect there is provided a water treatment apparatus. The water treatment apparatus may comprise a capacitive deionisation apparatus. The water treatment apparatus may also comprise a water conditioning element. The water conditioning element may comprise a metal alloy configured such that mineral ions within a flow of water, flowing over a surface of the water conditioning element, precipitate to provide a colloidal dispersion.

Capacitive deionisation and water conditioning are both technologies used for controlling scale formation in components exposed to water. However, the two technologies rely on fundamentally competing processes. Capacitive deionisation is used to reduce scale formation by removing dissolved mineral ions from the water, using an applied electrical field to move the ions to a capacitive electrode in which the ions are stored. In contrast, water conditioning increases scale formation in the bulk water to prevent adhesion to surfaces, by promoting precipitation of mineral ions into a colloidal dispersion.

Capacitive deionisation allows high water recovery but can cause scale formation, for example when operating at >50% TDS (total dissolved solids) reduction and/or high feed water hardness.

An advantage of using capacitive deionisation in combination with water conditioning is that the water conditioning element promotes scaling in the bulk water. That may reduce a risk of scale formation on the capacitive deionisation apparatus and reduce a need for cleaning the capacitive deionisation apparatus. That in turn may improve efficiency of the capacitive deionisation apparatus, whilst simultaneously reducing maintenance requirements and extending a working lifespan of the capacitive deionisation apparatus. The water conditioning element may also provide the water treatment apparatus with an additional mechanism for reducing scale formation, further improving the performance of the water treatment apparatus.

The water conditioning element may be disposed in a flow path of a fluid which passes through the capacitive deionisation apparatus.

The water conditioning element may be disposed upstream of electrodes of the capacitive deionisation apparatus.

That may enable the water conditioning element to promote scale formation in the bulk water prior to the water reaching the capacitive deionisation apparatus, further reducing a risk of scale formation on the capacitive deionisation apparatus.

The water conditioning element may be disposed within the capacitive deionisation apparatus.

That may enable a compact arrangement of the capacitive deionisation apparatus and the water conditioning element in the water treatment apparatus.

The capacitive deionisation apparatus may comprise a manifold connectable to a plurality of capacitive deionisation modules. Each capacitive deionisation module may comprise electrodes. The water conditioning element may be disposed within the manifold.

That may provide a particularly compact arrangement of the water treatment apparatus. That may also enable only one or a small number of water conditioning elements to provide enhanced performance of multiple capacitive deionisation modules simultaneously.

The water conditioning element may be secured within the capacitive deionisation apparatus by an interference fit. The water conditioning element may be secured within the manifold by an interference fit.

That may provide a simple integration of the water conditioning element into the capacitive deionisation apparatus. That may also reduce a need for additional parts to secure the water conditioning element, in turn reducing both exposure to risk of scale formation and maintenance requirements.

The water conditioning element may be secured within the capacitive deionisation apparatus by an interference fit with one or more components protruding from an internal surface of the capacitive deionisation apparatus. The water conditioning element may be secured within the manifold by an interference fit with one or more components protruding from an internal surface of the manifold.

The water treatment apparatus may comprise one or more inserts receivable within the capacitive deionisation apparatus to secure the water conditioning element (e.g., structure) in a desired position within the capacitive deionisation apparatus. The water treatment apparatus may comprise one or more inserts receivable within the manifold to secure the water conditioning element in a desired position within the manifold.

The water conditioning element may be shaped or configured to induce turbulence in fluid flowing over the water conditioning element.

That may enhance the precipitation of mineral ions into a colloidal dispersion, improving scale formation in the bulk water. That may also enable the water conditioning element to act as a static mixer for the water being delivered to the capacitive deionisation apparatus.

The water conditioning element may be located adjacent a cleaning fluid inlet of the capacitive deionisation apparatus.

That may enable the water conditioning element to act as a static mixer for the cleaning fluid. That may improve cleaning of the capacitive deionisation apparatus by providing a more even distribution of the cleaning fluid. That may also enable faster dilution of the cleaning fluid (which is typically an acid), reducing a risk of corrosion (for example, for any sensors disposed within the capacitive deionisation apparatus).

The water conditioning element may comprise, by weight, 40% to 50% Copper, 15% to 25% Nickel, 20% to 30% Zinc and 9% to 15% Tin. The water conditioning element comprises, by weight, approximately 45% Copper, approximately 20% Nickel, approximately 25% Zinc and approximately 10% Tin.

The capacitive deionisation apparatus may be or comprise a membrane capacitive deionisation apparatus.

Membrane capacitive deionisation has a greater efficiency and higher ion concentration than conventional capacitive deionisation. In addition, redox reactions at the membrane surface and differing diffusion rates for $H^+$ and $OH^-$ ions through the membrane cause variations in pH which increase a risk of scale formation. The presence of the membrane may form a channel or flow path between the membrane and the electrode, in which $H^+$ ions or $OH^-$ ions are retained (depending on the electrode polarity). The $H^+$ ions move faster and are able to migrate more quickly into the channel between the membrane and the electrode than the $OH^-$ ions. Redox reactions at the membrane surface also contribute to the concentration of $H^+$ ions and $OH^-$ ions in the channel. The presence of the membrane can therefore cause more significant pH variations (for example, compared to capacitive deionisation with no membrane present) which increase a risk of scale formation. Using a water conditioning element may therefore be particularly effective in combination with membrane capacitive deionisation due to the inherently higher risk of scale formation in membrane capacitive deionisation (for example, compared to capacitive deionisation with no membrane present).

According to a second aspect there is provided a method of treating water. The method may comprise treating the water using a capacitive deionisation apparatus. A water conditioning element may be disposed in a flow path of a fluid which passes through the capacitive deionisation apparatus. The water conditioning element may comprise a metal alloy configured such that mineral ions within a flow of water, flowing over a surface of the water conditioning element, precipitate to provide a colloidal dispersion.

The water conditioning element may be disposed upstream of electrodes of the capacitive deionisation apparatus.

The water conditioning element may be disposed within the capacitive deionisation apparatus.

The method of the second aspect may comprise one or more features corresponding to one or more features of the apparatus of the first aspect.

Features which are described in the context of separate aspects and embodiments of the invention may be used together and/or be interchangeable wherever possible. Similarly, where features are described in the context of a single embodiment for brevity, those features may also be provided separately or in any suitable sub-combination.

BRIEF DESCRIPTION OF DRAWINGS

For a fuller understanding of the nature and objects of the disclosure, reference should be made to the following detailed description taken in conjunction with the accompanying drawings in which.

DETAILED DESCRIPTION

Figure 1:
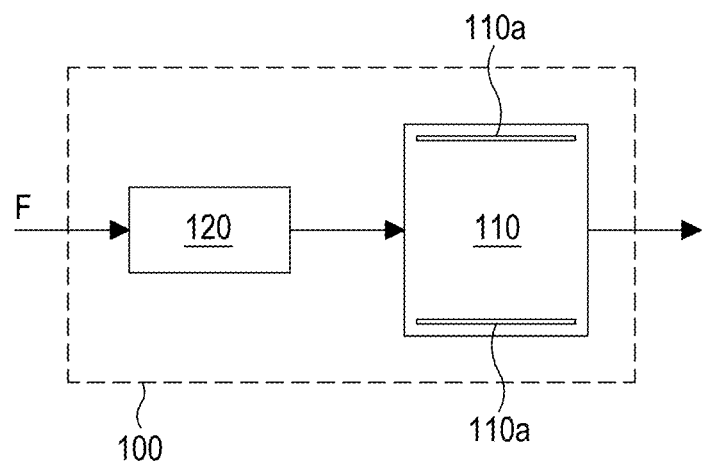
FIG. 1 shows an embodiment of a water treatment apparatus in accordance with the present invention, comprising a water conditioning element disposed in a flow path of a fluid through a capacitive deionisation apparatus.

FIG. 1 shows an embodiment of a water treatment apparatus 100. The water treatment apparatus 100 comprises a capacitive deionisation (CDI) apparatus 110 and a water conditioning element 120 disposed in a flow path F (indicated by arrows in FIG. 1) of a fluid through the CDI apparatus 110. In the embodiment shown, the water conditioning element 120 is disposed or located upstream of capacitive electrodes 110a of the CDI apparatus, although that is not essential. For example, the water conditioning element 120 may be located at substantially the same position as the CDI apparatus 110 (for example, the electrodes 110a) in a flow path F of fluid through the water treatment apparatus 100. The water conditioning element 120 and the electrodes 110a of the CDI apparatus 110 are provided in separate housings which are in fluid communication with one another, although that is not essential and the water conditioning element 120 and the electrodes 110a of the CDI apparatus 110 may be provided in a single housing or enclosure.

The water conditioning element 120 comprises a metal alloy configured such that mineral ions within the flow of water, flowing over a surface of the water conditioning element 120, precipitate to provide a colloidal dispersion. In the embodiment shown, the water conditioning element comprises, by weight, approximately 45% Copper, approximately 20% Nickel, approximately 25% Zinc and approximately 10% Tin. However, it will be appreciated the water conditioning element 120 may comprise any suitable metal alloy configured to cause precipitation of mineral ions in a flow of water over the surface of the water conditioning element 120 to provide a colloidal dispersion.

Figure 2:
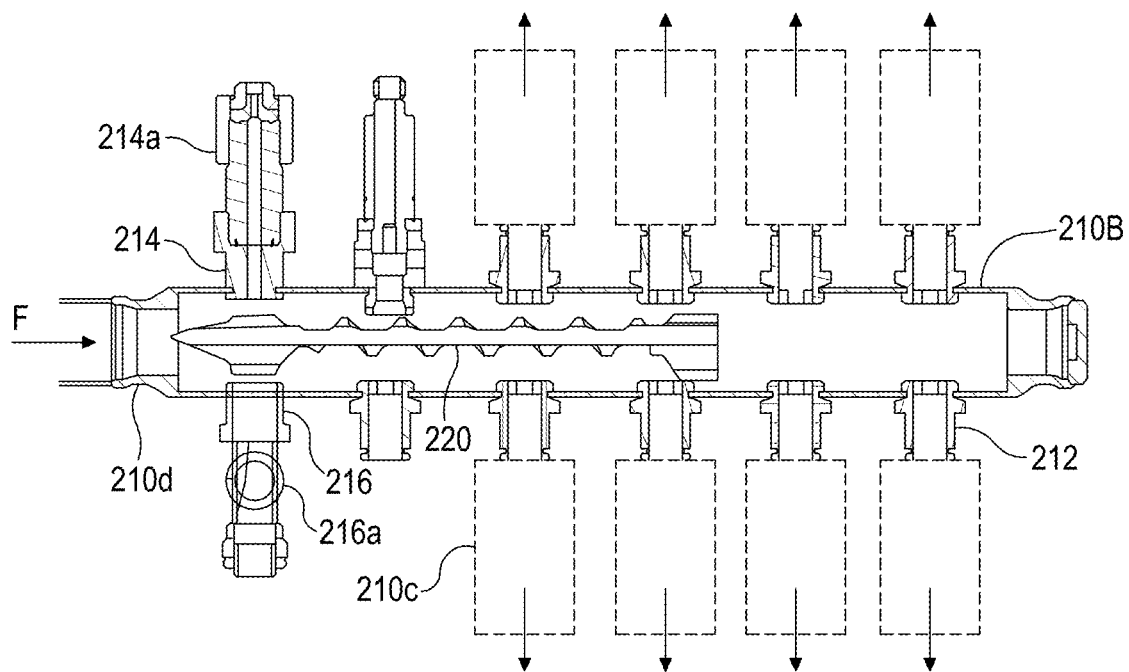
FIG. 2 shows another embodiment of a water treatment apparatus in accordance with the present invention, comprising a membrane capacitive deionisation apparatus and a water conditioning element disposed in a manifold of the membrane capacitive deionisation apparatus.

FIG. 2 shows another embodiment of a water treatment apparatus 200. The water treatment apparatus 200 is substantially similar to the water treatment apparatus 100 described with respect to FIG. 1, with like reference signs indicating like elements.

In the embodiment shown, the CDI apparatus 210 is a membrane capacitive deionisation (MCDI) apparatus, although that is not essential and any suitable CDI apparatus may alternatively be used. The MCDI apparatus 210 comprises a manifold 210b configured to receive a flow F of water to be treated. The manifold 210b is connectable to a plurality of MCDI modules 210c (shown schematically in dashed lines) in which capacitive electrodes 210a are provided. The manifold 210b is connected to each of the MCDI modules 210c by piping (not shown). However, that is not essential and the manifold 210b may alternatively be directed connected to the MCDI modules 210c (for example, by complementary threaded portions on the manifold 210b and the MCDI modules 210c). The water conditioning element 220 is provided within the manifold 210b of the MCDI apparatus, such that the water conditioning element 220 is located upstream of the electrodes 210a in each MCDI module 210c. However, as noted previously it will be appreciated the or a water conditioning element 220 may alternatively be provided directly within an or each MCDI module 210c.

Water to be treated flows into the manifold 210b via an inlet 210d of the manifold 210b, and flows over the water conditioning element 220, before flowing from the manifold 210b into the MCDI modules 210c. The water to be treated therefore undergoes conditioning via interaction with the water conditioning element 220 (causing some of the mineral ions in the flow F of water to precipitate to provide a colloidal dispersion) before entering the MCDI modules 210c in which mineral ions are subsequently removed from the flow F via the capacitive deionisation process.

In the embodiment shown, the manifold 210b comprises connection points 212 for connecting piping to feed each of the MCDI modules 210c. The connection points 212 each comprise push-fit connections provided in a wall of the manifold 210b, for example threaded into the wall of the manifold 210b. The connection points 212 therefore protrude into the internal space of the manifold 210b. Similarly, the manifold 210b also comprises connection points 214, 216 respectively provided for an injection valve 214a and a sample valve 216a. The connection points 214, 216 each comprises threaded sections protruding into the internal space of the manifold 210b. The manifold 210b may comprise further connection points mounting one or more other components, for example, a recirculation valve, a flow meter, a pressure transducer or other sensors etc. although that is not essential.

Figure 3:
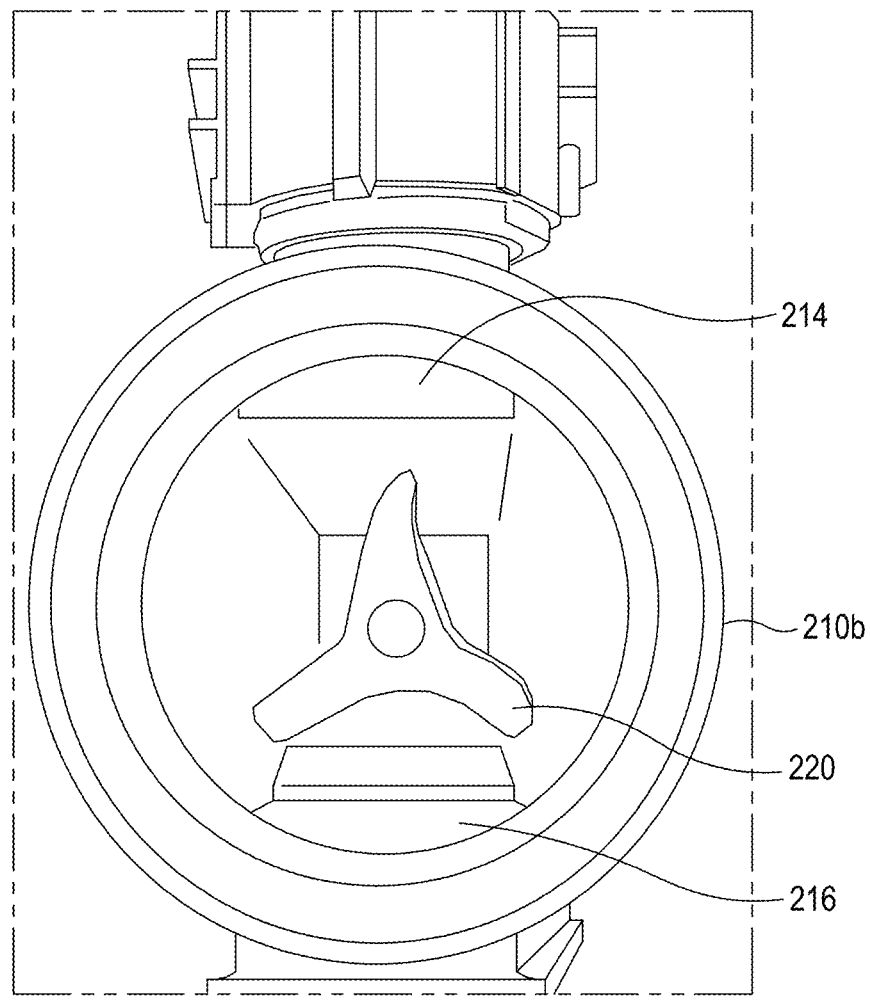
FIG. 3 shows a view of an end of the manifold shown in FIG. 2, with the water conditioning element secured within the manifold by an interference fit.

The water conditioning element 220 is secured within the manifold 210b via an interference fit between the water conditioning element 220 and one or more connection points 212, the connection point 214 and the connection point 216. FIG. 3 shows the water conditioning element 220 forming an interference fit with the connection points 214, 216. However, it will be appreciated the water conditioning element 220 may be secured within the manifold 210b via an interference fit with any one or more components or structures (for example, pins) protruding from an internal surface of the manifold 210b or into an internal space of the manifold 210b, and/or with an internal surface of the manifold 210b itself.

In the embodiment shown, the water conditioning element 220 is brought into an interference fit within the manifold 210b by inserting (for example, sliding) the water conditioning element 220 into the manifold 210 via the inlet 210d of the manifold 210b. In the embodiment shown, the manifold 210b comprises a substantially square, rectangular or box-shaped cross-section, although it will be appreciated the manifold 210b may comprise any suitable shape or cross-sectional configuration (for example, a circular cross-section, a polygonal cross-section such as pentagonal etc.).

Alternatively, the water conditioning element 220 may be secured within the manifold 210b by fabricating the manifold 210b around the water conditioning element 220 to form an interference fit. For example, a plurality of wall sections of the manifold may be provided around the water conditioning element 220 and secured to one another (for example, via a permanent connection such as a welded connection or secured with fasteners such as screws or bolts) to bring the internal surface of the manifold 210b or one or more structures protruding from an internal surface of the manifold 210b into contact with the water conditioning element 220 to form an interference fit. End pieces of the manifold 210b may be attached separately to seal the manifold 210b.

It will be appreciated that if the water conditioning element 220 is provided directly within an MCDI module 210c as described above (that is, with the water conditioning element 220 and electrodes of the CDI apparatus 210 being provided within a single housing or enclosure), the water conditioning element 220 may be secured within the single housing in a similar manner to that described with respect to the manifold 210b (for example, forming an interference fit with one or more components protruding from an internal surface of the housing, and/or with an internal surface of the housing itself. It will also be appreciated the water conditioning element 220 may be provided within any suitable housing, pipe or enclosure of the CDI apparatus 210 through which the flow F of water to be treated passes.

Additionally or alternatively, one or more inserts may be provided within the manifold 210b to secure the water conditioning element 220 in a desired position within the manifold 210b. The insert(s) may prevent or restrain movement of the water conditioning element 220 within the manifold 210b in one or more directions or along one or more axes. The insert(s) may be substantially rigid structures which effectively act as a mounting for the water conditioning element 220 within the manifold 210b. The insert(s) may be secured to the internal surface of the manifold 210b (for example, a permanent connection such as a welded connection or secured with fasteners such as screws or bolts) to fix the insert(s) in position within the manifold 210b, although that is not essential.

The water conditioning element 220 comprises an elongate structure comprising a plurality of helical ridges extending substantially along a length of the structure. The ridges define a flow path for fluid along the water conditioning element 220 and through the manifold 210b. The ridges each follow a substantially helical path around a longitudinal axis of the water conditioning element 220 to form a substantially corkscrew shaped structure, although that is not essential. The ridge or helical path may have a substantially constant angle relative to the longitudinal axis, or the ridge or helical path may have a variable angle relative to the longitudinal axis. The helical path of the ridges may induce or increase turbulence in the flow F of the fluid over the water conditioning element 220, to improve mixing of the fluid. However, it will be appreciated the conditioning element 220 may have any suitable shape or configuration to induce or increase turbulence in the fluid. For example, one or more ridges may follow a discontinuous path generally along a longitudinal axis of the elongate structure, defining a substantially discontinuous flow path for fluid flowing over the water conditioning element 220. The discontinuous flow path may be or comprise a pseudo-helical path around a longitudinal axis of the water conditioning element 220, in that the ridges each wind around the longitudinal axis, but the path followed by one or more of the ridges may comprise discontinuities each providing a distinct and sudden change of angle in the ridges rather than a smooth, continuous path. By increasing or inducing turbulence in the fluid flowing over the water conditioning element 220, the water conditioning element 220 acts as a static mixer for fluid in the water treatment apparatus 220. Alternatively, the water conditioning element 220 may comprise any suitable shape or configuration, and may not be configured to induce or increase turbulence in the fluid.

In the embodiment shown, the water conditioning element 220 is positioned within the manifold 210*b* such that at least a part of the water conditioning element 220 is located adjacent the connection point 214. The connection point 214 provides an inlet for the injection valve 214*a* to supply cleaning fluid (for example, an acid such as citric acid) into the manifold 210*b* when required. Providing the water conditioning element 220 adjacent the inlet for the cleaning fluid may allow the water conditioning element 220 to break up a flow of the cleaning fluid as it enters the manifold 210*b*. That may dilute the cleaning fluid more quickly, which in the case of an acid cleaning fluid may reduce a risk of corrosion of one or more components in the water treatment apparatus 200 (in particular, within the manifold 210*b*). That may also result in a move even distribution of the cleaning fluid within the water treatment apparatus 200, which may improve cleaning. It will be appreciated the increased dilution and more even distribution of the cleaning fluid may be further enhanced if a water conditioning element 220 configured to induce or increase turbulence of a fluid flowing over the water conditioning element 220 is used.

The water conditioning element 220 comprises a diameter of approximately 2.5 cm (1 inch) and extends along approximately two thirds of an internal length of the manifold 210*b*. However it will be appreciated the water conditioning element 220 may have any suitable size (diameter or thickness and/or length, for example depending on one or more factors such as an internal cross-sectional size or diameter of the manifold 210*b* or the part of the CDI apparatus 210 within which the water conditioning element 220 is located (in order to enable an interference fit to be formed), or an expected flow rate of water through the CDI apparatus 210.

From reading the present disclosure, other variations and modifications will be apparent to the skilled person. Such variations and modifications may involve equivalent and other features which are already known in the art of water treatment, in particular capacitive deionisation and/or water conditioning, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness, it is also stated that the term "comprising" does not exclude other elements or steps, the term "a" or "an" does not exclude a plurality, and any reference signs in the claims shall not be construed as limiting the scope of the claims.

The following statements are clauses (not claims) defining aspects of the invention.

1. A water treatment apparatus comprising: a capacitive deionisation apparatus; and a water conditioning element; wherein the water conditioning element comprises a metal alloy configured such that mineral ions within a flow of water, flowing over a surface of the water conditioning element, precipitate to provide a colloidal dispersion.

2. The water treatment apparatus of clause 1, wherein the water conditioning element is disposed upstream of electrodes of the capacitive deionisation apparatus.

3. The water treatment apparatus of clause 1 or of clause 2, wherein the water conditioning element is disposed within the capacitive deionisation apparatus.

4. The water treatment apparatus of any preceding clause, wherein: the capacitive deionisation apparatus comprises a manifold connectable to a plurality of capacitive deionisation modules, each capacitive deionisation module comprising electrodes; and the water conditioning element is disposed within the manifold.

5. The water treatment apparatus of any preceding clause, wherein the water conditioning element is secured within the capacitive deionisation apparatus by an interference fit.

6. The water treatment apparatus of clause 5, wherein the water conditioning element is secured within the capacitive deionisation apparatus by an interference fit with one or more components protruding from an internal surface of the capacitive deionisation apparatus.

7. The water treatment apparatus of any of clauses 4 to 6, wherein the apparatus comprises one or more inserts receivable within the capacitive deionisation apparatus to secure the water conditioning element in a desired position within the capacitive deionisation apparatus.

8. The water treatment apparatus of any preceding clause, wherein the water conditioning element is shaped or configured to induce turbulence in fluid flowing over the water conditioning element.

9. The water treatment apparatus of any preceding clause, wherein the water conditioning element is located adjacent a cleaning fluid inlet of the capacitive deionisation apparatus.

10. The water treatment apparatus of any preceding clause, wherein the capacitive deionisation apparatus is or comprises a membrane capacitive deionisation apparatus.

11. The water treatment apparatus of any preceding clause, wherein the water conditioning element comprises, by weight, 40% to 50% Copper, 15% to 25% Nickel, 20% to 30% Zinc and 9% to 15% Tin.

12. The water treatment apparatus of clause 11, wherein the water conditioning element comprises, by weight, approximately 45% Copper, approximately 20% Nickel, approximately 25% Zinc and approximately 10% Tin.

13. A method of treating water, comprising: treating the water using a capacitive deionisation apparatus; wherein a water conditioning element is disposed in a flow path of a fluid through the capacitive deionisation apparatus, wherein the water conditioning element comprises a metal alloy configured such that mineral ions within a flow of water, flowing over a surface of the water conditioning element, precipitate to provide a colloidal dispersion.

The invention is limited only by the appended claims. Variations, characteristics, advantages, implementations, constructions, arrangements, terminology, materials, dimensions, embodiments, illustrations, depictions, and examples composing the above description and accompanying drawings show some possible implementations of the invention without limiting the invention. It is not necessary that every implementation of the invention achieve or possess every advantage, purpose, or characteristic identified herein, and as such, one skilled in the art may effect various additions, changes, modifications, or omissions without departing from the scope or spirit of the invention or its legal equivalents. Like reference numerals in different Figures may represent like elements.

All ranges are inclusive of the stated limits, the orders of magnitude thereof, and all values and ranges substantially therebetween unless otherwise defined. Unless otherwise stated, every use of "and" forms an inclusive list comprising at least the conjoined elements, and every use of "or" forms an inclusive list comprising at least one element of conjoined elements. Unless otherwise stated, singular usage (e.g., 'a', 'an', or 'the') includes plurals of the same.

The order of recitations in a claim do not imply a temporal or ordered relationship unless unavoidable by the plain language of that claim. No claim may be interpreted to invoke 35 U.S.C. § 112(f) unless that claim recites "means for" or "step for."

We claim:

1. A water treatment apparatus comprising:
   a capacitive deionisation apparatus; and
   a water conditioning element;
   wherein the water conditioning element comprises a metal alloy configured such that mineral ions within a flow of water, flowing over a surface of the water conditioning element, precipitate to provide a colloidal dispersion.

2. The water treatment apparatus of claim 1, wherein the water conditioning element is disposed upstream of electrodes of the capacitive deionisation apparatus.

3. The water treatment apparatus of claim 1, wherein the water conditioning element is disposed within the capacitive deionisation apparatus.

4. The water treatment apparatus of claim 1, wherein:
   the capacitive deionisation apparatus comprises a manifold connectable to a plurality of capacitive deionisation modules, each capacitive deionisation module comprising electrodes; and
   the water conditioning element is disposed within the manifold.

5. The water treatment apparatus of claim 4, wherein the apparatus comprises one or more inserts receivable within the capacitive deionisation apparatus to secure the water conditioning element in a desired position within the capacitive deionisation apparatus.

6. The water treatment apparatus of claim 1, wherein the water conditioning element is secured within the capacitive deionisation apparatus by an interference fit.

7. The water treatment apparatus of claim 6, wherein the water conditioning element is secured within the capacitive deionisation apparatus by an interference fit with one or more components protruding from an internal surface of the capacitive deionisation apparatus.

8. The water treatment apparatus of claim 1, wherein the water conditioning element is shaped or configured to induce turbulence in fluid flowing over the water conditioning element.

9. The water treatment apparatus of claim 1, wherein the water conditioning element is located adjacent a cleaning fluid inlet of the capacitive deionisation apparatus.

10. The water treatment apparatus of claim 1, wherein the capacitive deionisation apparatus is or comprises a membrane capacitive deionisation apparatus.

11. The water treatment apparatus of claim 1, wherein the water conditioning element comprises, by weight, 40% to 50% Copper, 15% to 25% Nickel, 20% to 30% Zinc and 9% to 15% Tin.

12. The water treatment apparatus of claim 11, wherein the water conditioning element comprises, by weight, approximately 45% Copper, approximately 20% Nickel, approximately 25% Zinc and approximately 10% Tin.

13. A method of treating water, comprising:
   treating the water with a capacitive deionisation apparatus;
   flowing the water through a flow path through the capacitive deionisation apparatus, wherein the flow path comprises a water conditioning element, wherein the water conditioning element comprises a metal alloy configured such that mineral ions within the flow of water, flowing over a surface of the water conditioning element, precipitate to provide a colloidal dispersion.

* * * * *